United States Patent [19]

Iwaki et al.

[11] 4,387,314
[45] Jun. 7, 1983

[54] CHARGING GENERATOR FOR MOTOR VEHICLE

[75] Inventors: Yoshiyuki Iwaki, Himeji; Hitoshi Goto, Kakogawa, both of Japan

[73] Assignee: Mitsubishi Denki Kabushiki Kaisha, Tokyo, Japan

[21] Appl. No.: 269,658

[22] Filed: Jun. 2, 1981

[30] Foreign Application Priority Data

Jun. 10, 1980 [JP] Japan ............................. 55-81990[U]

[51] Int. Cl.³ ........................................... H02K 5/10
[52] U.S. Cl. ..................................... 310/88; 310/239
[58] Field of Search ......................... 310/88, 238, 239

[56] References Cited

U.S. PATENT DOCUMENTS 4,341,967  7/1982  Iwaki ...................................... 310/88

FOREIGN PATENT DOCUMENTS 2448522  5/1975  Fed. Rep. of Germany ........ 310/88
1027113  4/1966  United Kingdom .................. 310/88

Primary Examiner—John Gonzales
Attorney, Agent, or Firm—Wenderoth, Lind & Ponack

[57] ABSTRACT

A charging generator for a motor vehicle has a rear casing portion including a flat end wall facing a brush holder. Two protuberances and a protuberance are disposed in opposed staggered relationship on opposed portions of the flat end wall and the brush holder to form a labyrinth between them. The labyrinth is filled with a grease and blocks the space between vent holes disposed in the flat end wall and the brushes housed in the brush holder.

2 Claims, 4 Drawing Figures

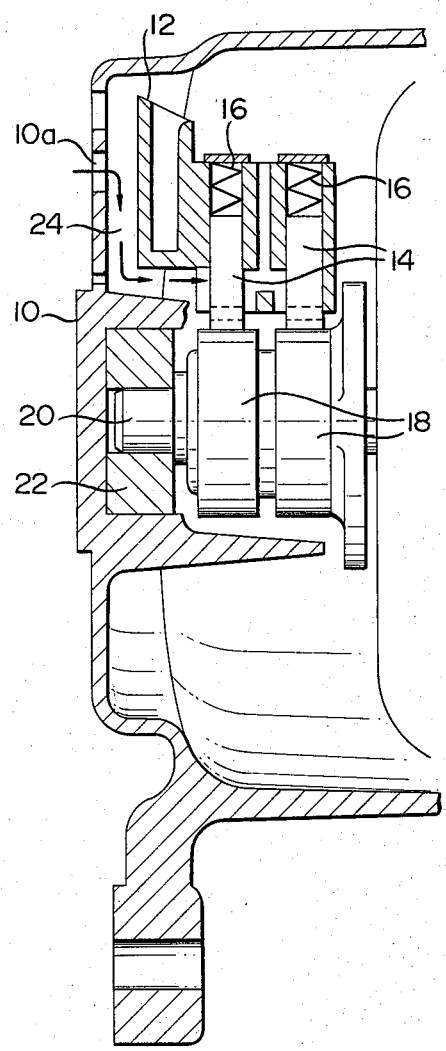
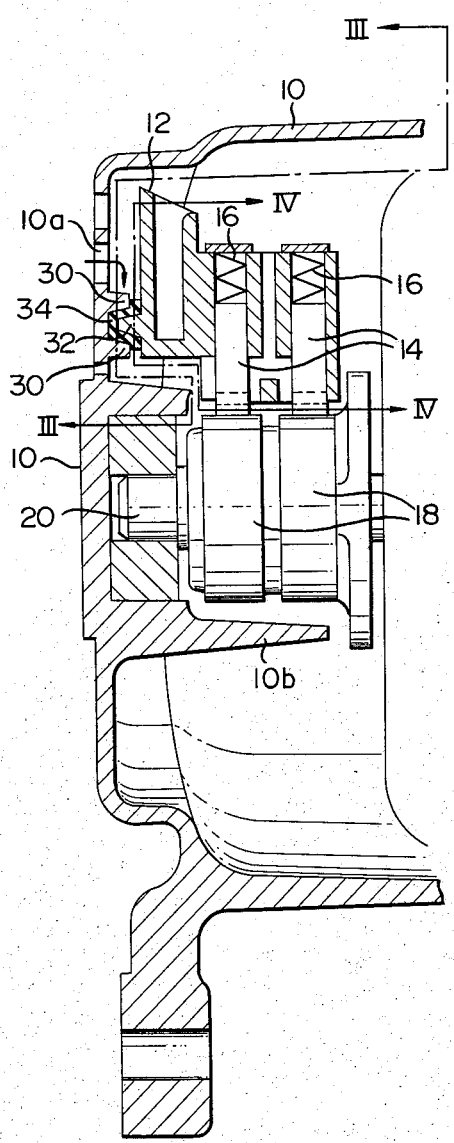
FIG. 1 PRIOR ART
FIG. 2

CHARGING GENERATOR FOR MOTOR VEHICLE

BACKGROUND OF THE INVENTION

This invention relates to a charging generator for a motor vehicle and more particularly to a water-proofing structure for such a charging generator.

In conventional charging generators for motor vehicles, brine and other materials have penetrated into the interior thereof through vent holes for cooling air and have reached the set of associated brushes. Thus the brushes have been eroded or corroded and thereby caused to be stuck to the interior of the mating brush holder. This has resulted in the drawback that the brushes fail to remain in complete slidable engagement with associated slip rings.

Accordingly it is an object of the present invention to provide an improved charging generator for a motor vehicle including simple means for preventing brine and other materials entering the generator from reaching brushes involved.

SUMMARY OF THE INVENTION

The present invention provides a charging generator for a motor vehicle comprising a bracket, a brush holder disposed within the bracket to house a set of brushes, the brush holder including one portion opposite to an adjacent portion of the inner surface of the bracket, and a plurality of protuberances disposed in opposed staggered relationship on the opposite portions of the bracket and the brush holder to form a labyrinth therebetween.

Preferably the labyrinth is filled with a water-proof lubricant.

BRIEF DESCRIPTION OF THE DRAWINGS

The present invention will become more readily apparent from the following detailed description taken in conjunction with the accompanying drawings in which:

FIG. 1 is a side elevational sectional view of a rear portion of a conventional charging generator for a motor vehicle with parts illustrated in elevation;

FIG. 2 is a side elevational sectional view of one embodiment of a charging generator of the present invention for use with motor vehicles with parts illustrated in elevation;

DESCRIPTION OF THE PREFERRED EMBODIMENTS

Figure 3:
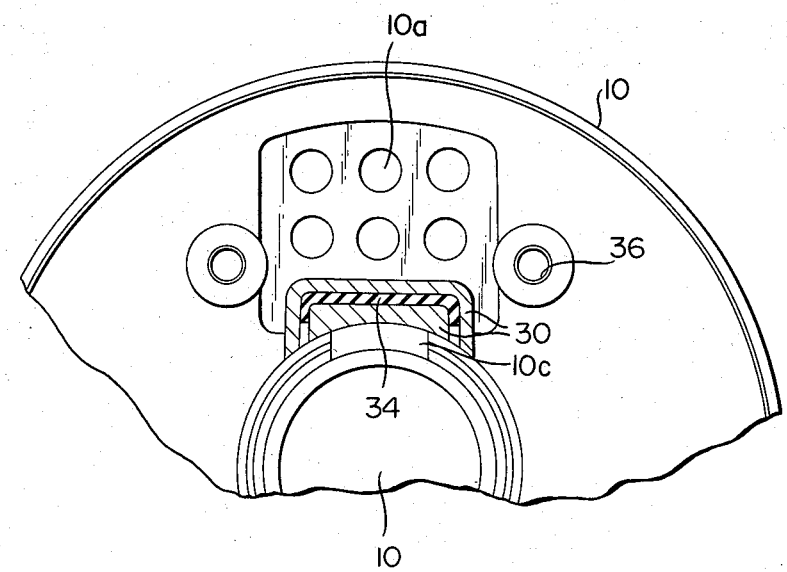
FIG. 3 is a fragmental front plan view, partially in section, of the bracket shown in FIG. 2 and viewed on the line III—III of FIG. 2 with the bearing as shown in FIG. 2 omitted.

Referring now to FIG. 1 of the drawings, there is illustrated a rear portion of a conventional charging generator for a motor vehicle. The arrangement illustrated comprises a rear casing portion 10 including a flat end wall provided on the upper portion as viewed in FIG. 1 with a plurality of vent holes 10a (only one of which is shown) and an inwardly projecting bell 10b and a brush holder 12 suitably fixed to the rear casing portion 10 to be formed into a unitary structure with an electronic voltage regulator (not shown). The brush holder 12 is shown in FIG. 1 as including therein a pair of brushes 14 disposed in spaced parallel relationship and extending in the radial direction of the generator 10 and slidable in the same direction. Also disposed in the brush holder 12 are a pair of springs 16 tending normally to push the mating brushes 14 radially inwardly of the generator through brush opening 10c so that the brushes 14 are always in slidable engagement with respective slip rings 18 electrically insulatingly secured to a rotary shaft 20 within the bell 10b for the generator and having one end journaled in a bearing 22 disposed centrally on the inner surface of the flat end wall of the rear casing portion 10. As is well known, the slip rings 18 serve to conduct electric power from one to the other of a stationary and a rotor unit of the generator.

Also the brush holder 12 is located near to the vent holes 10a with a space 24 being left between the same and the flat end wall of the rear casing portion 10. The space 24 communicates with vent holes 10a and reaches the brushes 14 and therefore the slip rings 18.

In the arrangement of FIG. 1, brine and other material have been able to penetrate into the inside of the rear casing portion 10 through the vent holes 10a along with cooling air and then pass through the space 24 formed between the brush holder 12 and the rear casing portion 10 until they reach the brushes 14. As a result, the brushes 14 have been eroded or corroded until the brushes are stuck to the interior of brush holder 14. This has resulted in the drawback that the brushes fail to remain in complete slidable engagement with the mating slip rings 18.

The present invention seeks to provide an excellent charging generator for a motor vehicle free from the drawback of the prior art structure as described above.

Referring now to FIG. 2 wherein like reference numerals designated the components identical to those shown in FIG. 1, there is illustrated one embodiment of the charging generator of the present invention for use with motor vehicles. The arrangement illustrated is different from that shown in FIG. 1 only in that in FIG. 2, the space 24 includes a labyrinth which is, in turn, filled with a water-proof lubricant.

As shown in FIG. 2, a pair of protuberances 30 with flat tops are disposed in spaced parallel relationship on the inner surface of the flat end wall of the rear casing portion 10 below the vent holes 10a facing the opposing surface of the brush holder 12 with respective spaces left therebetween. As shown best in FIG. 3, the protuberances 30 are in the form of an inverted U and have the ends extending to the outer peripheral surface of the bell 10b, on the opposite sides of the brush opening 10c, and the protuberances define a similarly U-shaped slot therebetween.

On the other hand, a protuberance 32 with a flat top is disposed on the surface of the brush holder 12 opposed to the flat end wall of the rear casing portion 10 to extend into the slot as described above. As shown best in FIG. 4, the protuberance 32 is also in the form of an inverted U. The protuberance 32 is in staggered relationship to the protuberances 30 to form a labyrinth therebetween and between the adjacent opposed portion of the rear casing portion 10 and the brush holder within the space 24 extending between the vent holes 10a and the brushes 14.

Then the labyrinth is filled with a water-proof lubricant such as a grease 34.

FIG. 3 shows also a pair of screw threaded holes 36 for accomodating screws to mount the brush holder 12 to the rear casing portion 10.

Figure 4:
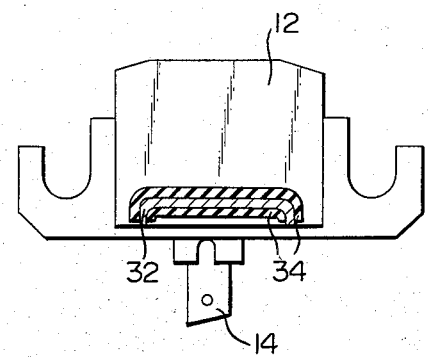
FIG. 4 is a front plan view, partly in section of the brush holder shown in FIG. 2 as viewed on the line IV—IV of FIG. 2.

In the arrangement shown in FIGS. 2, 3 and 4, the labyrinth formed as described above makes it difficult for brine and other materials coming through the vent holes 10a to reach the brushes 14 and the slip rings 18. In addition, the grease 34 filled into the labyrinth repels the brine and other materials so as to prevent them from flowing toward the brushes 14 and the slip rings 18 due to the surface tension of the lubricant.

It has been found that the arrangement shown in FIGS. 2, 3 and 4 exhibits a satisfactory water-proofing effect with the grease 34 omitted.

From the foregoing it is seen that the present invention comprises simple means consisting of a plurality of protuberances disposed in opposed staggered relationship on opposed portions of a brush holder and a casing portion to form a labyrinth therebetween. The labyrinth effectively prevents brine and other materials entering the inside of the casing portion from reaching associated brushes and slip rings. Thus the present invention can prevent the brushes from failing to remain in slidable engagement with the slip rings resulting from the erosion or corrosion of the brushes and also exhibit a waterproofing effect. Accordingly the present invention is more economical.

Further by filling the labyrinth with a waterproof lubricant, the effect of the present invention is enhanced.

While the present invention has been illustrated and described in conjunction with a single preferred embodiment thereof it is to be understood that numerous changes and modifications may be resorted to without departing from the spirit and scope of the present invention. For example, the rear casing portion may be provided with a different number of protuberances from that illustrated and the brush holder can be provided with more than one protuberance. In the latter case the number of the protuberances on the rear casing portion is preferably greater than that on the brush holder by one.

What is claimed is:

1. A charging generator for a motor vehicle, comprising a rear casing portion having a flat end wall and a bell extending into the casing from said end wall for housing slip rings of the generator, said bell having a brush opening therein, and said end wall having vent openings therein, a brush holder in said casing portion and having brushes therein slidable through said brush opening for engagement with the slip rings in the bell, said brush holder having a surface spaced from said end wall and said bell for defining a space extending from said vent holes to said brushes, a plurality of spaced parallel protuberances on said wall and extending toward said surface of said brush holder, said protuberances having an inverted U-shape with the ends extending to said bell, and defining a groove therebetween, and a further protuberance on said surface of said brush holder having an inverted U-shaped and extending toward said end wall and into said groove to form a labyrinth seal with said spaced parallel protuberances substantially blocking flow of liquid along said space.

2. A charging generator as claimed in claim 1 in which said labyrinth seal is filled with a water-proof lubricant.

* * * * *